United States Patent
Xing

(10) Patent No.: US 8,401,516 B2
(45) Date of Patent: Mar. 19, 2013

(54) METHOD AND DEVICE FOR RECEIVING EMERGENCY BROADCASTING MESSAGES

(75) Inventor: Xing Xing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 13/147,209

(22) PCT Filed: Nov. 19, 2009

(86) PCT No.: PCT/CN2009/075043
§ 371 (c)(1),
(2), (4) Date: Aug. 1, 2011

(87) PCT Pub. No.: WO2010/088825
PCT Pub. Date: Aug. 12, 2010

(65) Prior Publication Data
US 2011/0287735 A1    Nov. 24, 2011

(30) Foreign Application Priority Data
Feb. 6, 2009    (CN) .......................... 2009 1 0008728

(51) Int. Cl.
H04M 11/04    (2006.01)
(52) U.S. Cl. ................... 455/404.1; 455/404.2; 455/403
(58) Field of Classification Search .... 455/404.1–404.2; 370/312
See application file for complete search history.

(56) References Cited

U.S. PATENT DOCUMENTS

| | | | |
|---|---|---|---|
| 6,370,391 B1 * | 4/2002 | Lietsalmi et al. | 455/466 |
| 7,130,610 B2 * | 10/2006 | Dolezal et al. | 455/404.1 |
| 7,426,203 B1 * | 9/2008 | McNamara et al. | 370/338 |
| 2003/0207670 A1 * | 11/2003 | Fernandez et al. | 455/12.1 |
| 2005/0037728 A1 * | 2/2005 | Binzel et al. | 455/404.1 |
| 2006/0015916 A1 * | 1/2006 | Yun | 725/108 |
| 2006/0058005 A1 * | 3/2006 | Dolezal et al. | 455/404.1 |

(Continued)

FOREIGN PATENT DOCUMENTS

| | | |
|---|---|---|
| CN | 1972517 A | 5/2007 |
| CN | 101286809 A | 10/2008 |

(Continued)

OTHER PUBLICATIONS

International Search Report in international application No. PCT/CN2009/075043, mailed on Feb. 25, 2010.

(Continued)

Primary Examiner — Jean Gelin
Assistant Examiner — Nathan Taylor
(74) Attorney, Agent, or Firm — Oppedahl Patent Law Firm LLC

(57) ABSTRACT

The present invention discloses a method for receiving emergency broadcasting messages. The method comprises that: when the terminal acquires periodically from the information header of the multimedia broadcasting service information that there is a new emergency broadcasting message needed to be received, it parses the emergency broadcasting message from the multimedia broadcasting control information; alternatively, under the scene that the terminal receives the multimedia broadcasting service information, when the terminal acquires from the information header of the service information that there is a new emergency broadcasting message queue needed to be received, it parses the emergency broadcasting message from the multimedia broadcasting control information. The present invention discloses a communication mobile terminal for receiving emergency broadcasting messages. The present invention enables the terminal to open the logic channels periodically to receive all emergency broadcasting messages punctually and effectively prevents the high power consumption and resource wasting in the course of reception.

13 Claims, 6 Drawing Sheets

U.S. PATENT DOCUMENTS

| | | | |
|---|---|---|---|
| 2007/0037549 A1* | 2/2007 | Poltorak | 455/404.1 |
| 2007/0207771 A1* | 9/2007 | Bowser et al. | 455/404.1 |
| 2008/0085695 A1* | 4/2008 | Vare et al. | 455/404.1 |
| 2008/0227428 A1* | 9/2008 | Rezaiifar et al. | 455/404.1 |
| 2008/0261554 A1* | 10/2008 | Keller et al. | 455/404.1 |
| 2009/0239498 A1* | 9/2009 | Lee et al. | 455/404.1 |
| 2009/0253401 A1* | 10/2009 | Lee et al. | 455/404.1 |
| 2009/0286502 A1* | 11/2009 | Sennett et al. | 455/404.1 |
| 2010/0197265 A1* | 8/2010 | Dorenbosch et al. | 455/404.1 |
| 2010/0302988 A1* | 12/2010 | Becker | 370/312 |

FOREIGN PATENT DOCUMENTS

| | | |
|---|---|---|
| CN | 101369854 A | 2/2009 |
| CN | 101483833 A | 7/2009 |
| KR | 20030080141 A | 10/2003 |
| WO | 2008097894 A1 | 8/2008 |

OTHER PUBLICATIONS

English Translation of the Written Opinion of the International Search Authority in international application No. PCT/CN2009/075043, mailed on Feb. 25, 2010.

Analysis and Application of Bit Fields of CMMB Multiplexing Frames Nov. 2008.

Mobile multimedia broadcasting (CMMB)—Emergency Broadcasting Service Aug. 2008.

Mobile multimedia broadcasting. Part 4. Emergency broadcasting Nov. 14, 2007.

* cited by examiner

METHOD AND DEVICE FOR RECEIVING EMERGENCY BROADCASTING MESSAGES

TECHNICAL FIELD

The present invention relates to the technology for receiving multimedia broadcasting signal by a mobile terminal, and especially to a method and device for receiving emergency broadcasting messages via multimedia broadcasting.

BACKGROUND

Digital mobile multimedia broadcasting technologies and standards have been developing rapidly in recent years, such as European Digital Video Broadcast Handheld (DVB-H) system, American Media Forward Link Only (MediaFLO) system, mobile cellular based Broadcast and Multicast Services (BCMCS) system and China Mobile Multimedia Broadcasting (CMMB) system, etc. The digital mobile multimedia broadcasting network provides many service contents, such as advertisement, weather forecast, news, sports shows, variety shows, multimedia radio play, movies, etc., to is terminal users thereof; the users can select the service program provided by the mobile multimedia broadcasting by preference.

The so-called mobile TV service, in short, is a service of watching TV programs by using a mobile phone terminal of mobile communication. As an emerging service, compared with the traditional TV being watched by the whole family in the living room, the mobile TV is featured with portability, mobility and privacy. With the popularization of mobile data service and the development of mobile phone video functions, the mobile TV starts to come into people's life gradually. With the continuous improvement in living standard, consumer demands are diversified and fashion-orientated, and it becomes a fashion to watch TV programs on the mobile phone, and it will become a manner for people to enjoy life.

In terms of the development of broadcasting TV services, the traditional radio and TV broadcasting technology has been in the development from an analogue technology to a digital technology, and the device for receiving TV signal also develops from an ordinary desktop TV set to diversified terminals, such as mobile TV, vehicle-bone TV, and handheld TV, etc. In terms of development trend of mobile communication, with the substantial increase in data transmission capacity of mobile communication networks and the continuous improvement of terminal manufacture technologies, it becomes possible to watch TV programs via the mobile phone terminal. Technical progresses in these two aspects open a path for receiving video program content of high quality via the mobile phone terminal and melt the rigid boundary between the two industries, thus prompting an entirely new service mode, i.e. the mobile TV.

Emergency broadcasting is a way for announcing emergency events to the public via a broadcasting communication system. When emergency events occur, such as natural disaster, accident disaster, public health and social security, etc., which result in, or may result in heavy casualties, property loss, ecologic and environmental damage, and serious social danger and public security danger, the emergency broadcasting provides a fast and easy announcing manner. With the emphasis of the nation on various emergency events and the proposing of various public emergency pre-arranged planning, it is very necessary to provide an emergency broadcasting service as a broadcasting technique having a large number of online users. The mobile phone terminal having the function of receiving emergency broadcasting messages can receive the emergency broadcasting messages sent from an emergency broadcasting system.

As shown in FIG. 1, it illustrated is a structural diagram of broadcasting channel frames of the CMMB system. The broadcasting channel frame consists of multiple multiplex frames, and each multiplex frame is composed of a multiplex frame head, a multiplex frame payload and a filling part, while the multiplex frame payload is composed of multiple multiplex subframes.

For example, if 1 second is determined to be the multiplex period and divided into 40 equal portions of time periods (time slots), the multiplex unit is 25 ms. Logically, the multiplex frame and time slot mapping are determined by the configuration of system.

One multiplex frame corresponds to one control or service logical channel, and each multiplex frame is assigned with one multiplex frame identification MF_ID in a range from 0 to 39, with 39 being the maximum value. Wherein the multiplex frame with MF_ID=0 is mapped into the control logical channel for transmitting system control information; the multiplex frame with ML_ID#0 (namely MF_ID=1~39) is mapped into the service logical channel for transmitting service data.

As shown in FIG. 2, the multiplex frame with the multiplex frame identification being 0 (MF_ID=0) is used for carrying the control information, and the multiplex frame payload in the multiplex frame comprises multiple control information tables, i.e., each multiplex subframe consists of one control information table. The emergency broadcasting message table is carried by the control information table with the table ID number being 0x10.

In the existing CMMB specification, the emergency broadcasting service is put in the multiplex frame carrying the control information (i.e. multiplex frame 0, MF_ID=0) for transmission. The receiver is arranged into multiple reception channels according to the performance of the terminal for receiving the broadcasting message; due to the is limitation of the existing technology, the receiver can be arranged into only two reception channels, i.e. logic channel 0 and logic channel 1. Generally, logic channel 0 is used for receiving the control information multiplex frame (i.e. multiplex frame 0), while logic channel 1 is used for receiving service data multiplex frame (i.e. the non-zero multiplex frame, MF_ID≠0).

In the existing technology, the method for receiving emergency broadcasting messages by the user terminal is that:

the terminal detects the 'emergency broadcasting indication' field value in the multiplex frame head. As shown in FIG. 3, 0 represents that there is no emergency broadcasting message; when the field value turns from 0 to non-zero, it shows that there is an emergency broadcasting message in the control information multiplex frame (identified by the message ID); the terminal enters logic channel 0 to receive the control information multiplex frame, and to parse the emergency broadcasting information table consisting of emergency broadcasting table head and emergency broadcasting data segment, etc., (the control information table with the table ID number being 0x10), based on the frame structure as shown in FIG. 2.

When the 'emergency broadcasting indication' field in FIG. 3 has a new emergency broadcasting message queue to be sent at the transmitting end, the value of this field progressively increases by 1 circularly in the range of 1-3 (i.e. 01-11); or after all the emergency broadcasting message queues have been transmitted in the broadcasting network, the field value turns to 0. That is to say, the field value changes only under these two circumstances, while the field value does not change in the course of circularly transmitting a same emergency broadcasting message in the broadcasting network.

The 'concurrent message quantity' in the emergency broadcasting table head in FIG. 2 is 4-bit field with the value thereof ranging from 0 to 15 for representing the quantity of messages to be sent currently in the emergency broadcasting front end transmitting queue. The receiving terminal can determine whether to receive all the emergency broadcasting messages in this message queue according to the field. The message ID is used for identifying the emergency broadcasting message being sent currently in the control information multiplex frame.

The existing technology for receiving emergency broadcasting messages by the terminal has the following disadvantages:

(1) the terminal does not enter the mobile TV, until the emergency broadcasting transmitting front end continuously transmit multiple emergency broadcasting messages simultaneously, and the terminal can not receive all the emergency broadcasting messages until the end of the transmitting period of the multiple emergency broadcasting messages;

(2) if logic channel 1 has been occupied to receive the TV service information at the moment when the user enters the mobile TV and is watching TV, and the emergency broadcasting transmitting front end continuously transmits multiple emergency broadcasting messages simultaneously, if the terminal always uses logic channel 0 to receive the control information multiplex frame, it consumes a large amount of power and wastes a large number of resources in the course of reception, though it can receive all the emergency broadcasting messages.

SUMMARY

The technical problem to be solved by the present invention is to provide a method and device for receiving emergency broadcasting messages, in order to enable a mobile terminal to receive all the emergency broadcasting messages completely at any time, and prevent high power consumption and resource wasting in the course of reception.

To solve the above-mentioned technical problem, the present invention provides a method for receiving emergency broadcasting messages, which is used in a communication mobile terminal, the method comprises: when a terminal acquires periodically from an information header of multimedia broadcasting service information that there is a new emergency broadcasting message needed to be received, parsing the emergency broadcasting messages from control information and displaying.

Further, when the terminal does not receive the multimedia broadcasting service information via a second logic channel, it may periodically receive and parse the multimedia broadcasting control information and the information header thereof via a first logic channel; after parsing and displaying all the messages in emergency broadcasting message queue from the multimedia broadcasting control information, the terminal may stop receiving the multimedia broadcasting control information.

Further, prior to periodically receiving the multimedia broadcasting control information, the method may further comprise: initializing emergency broadcasting message variables, i.e., setting the value of an emergency broadcasting indicator variable to be a first initial value, setting the values of a concurrent message quantity variable and a received message quantity variable to be a second initial value respectively, and setting a message queue linked list to be Null; wherein the first initial value may be equal to the initial value of emergency broadcasting indication information in the information header for representing that there is a new emergency broadcasting message queue, and the second initial value may be equal to the initial value of concurrent message quantity information in the multimedia broadcasting control information for representing the message quantity in the emergency broadcasting message queue.

Further, the method may further comprise:

(1) receiving the multimedia broadcasting control information, and parsing the emergency broadcasting indication information from the information header of the multimedia broadcasting control information, then determining whether the value of the emergency broadcasting indication information is equal to the value of the emergency broadcasting indicator variable; if yes, executing step (3); otherwise, setting the value of the emergency broadcasting indicator variable to be equal to the value of emergency broadcasting indication information;

(2) parsing the emergency broadcasting information in the multimedia broadcasting control information, extracting the concurrent message quantity information and message ID, and determining whether there is the message ID in the message queue linked list, if yes, executing step (3); otherwise, setting the value of concurrent message quantity variable to be equal to the value of the concurrent message quantity information; shifting the value of the received message quantity variable by one unit is quantity, which is used for representing one emergency broadcasting message in the emergency broadcasting message queue, and then putting the message ID in the message queue linked list; and at the same time, displaying the present emergency broadcasting message;

(3) determining whether the value of the concurrent message quantity variable is less than the value of the received message quantity variable, if yes, continuing receiving the control information, and then repeatedly executing step (2); otherwise, resetting the value of the concurrent message quantity variable and the value of the received message quantity variable to be equal to the second initial value respectively, resetting the message queue linked list to be Null, and stopping receiving the control information at the same time.

To solve the above-mentioned technical problem, the present invention provides a method for receiving emergency broadcasting messages, which is used in a communication mobile terminal, the method comprises: when a terminal receives a multimedia broadcasting service information and acquires from an information header of the multimedia broadcasting service information that there is a new emergency broadcasting message queue needed to be received, parsing the emergency broadcasting messages from multimedia broadcasting control information and displaying.

Further, the terminal may receive the multimedia broadcasting service information via a second logic channel, and continue receiving the service information via the second logic channel after parsing and displaying all the messages in the emergency broadcasting message queue from the received multimedia broadcasting control information via a first logic channel.

Further, prior to receiving the multimedia broadcasting service information by the terminal, the method may further comprise: initializing emergency broadcasting message variables, i.e., setting the value of an emergency broadcasting indicator variable to be a first initial value, setting the values of a concurrent message quantity variable and a received message quantity variable to be a second initial value respectively, and setting a message queue linked list to be Null; wherein the first initial value may be equal to the initial value of emergency broadcasting indication information in the information header for representing that there is a new emergency broadcasting message queue, and the second initial value may be equal to the initial value of concurrent message quantity information in the control information for representing the message quantity in the emergency broadcasting message queue.

Further, the method may further comprise:

(1) receiving the service information, and parsing the emergency broadcasting indication information from the information header of the service information, then determining whether the value of the emergency broadcasting indication information is equal to the value of the emergency broadcasting indicator variable; if yes, executing step (3); otherwise, setting the value of the emergency broadcasting indicator variable to be equal to the value of emergency broadcasting indication information;

(2) receiving the control information, parsing the emergency broadcasting information in the control information, extracting the concurrent message quantity information and message ID, and determining whether there is the message ID in the message queue linked list, if yes, executing step (3); otherwise, setting the value of concurrent message quantity variable to be equal to the value of the concurrent message quantity information; shifting the value of the received message quantity variable by one unit quantity, which is used for representing one emergency broadcasting message in the emergency broadcasting message queue, and then putting the message ID in the message queue linked list; and at the same time, displaying the present emergency broadcasting message;

(3) determining whether the value of the concurrent message quantity variable is less than the value of the received message quantity variable, if yes, repeatedly executing step (2); otherwise, resetting the value of the concurrent message quantity variable and the value of the received message quantity variable to be equal to the second initial value, and resetting the message queue linked list to be Null, and then repeatedly executing step (1).

To solve the above-mentioned technical problem, the present invention provides a communication mobile terminal for receiving emergency broadcasting messages, it comprises a control unit, a reception unit, a parsing and comparing unit and a display unit, which are connected in sequence, wherein:

the control unit is used for periodically starting the reception unit to receive multimedia broadcasting information, and at the same time, indicating the parsing and comparing unit to parse an information header of multimedia broadcasting service information;

the reception unit is used for outputting the received multimedia broadcasting service information to the parsing and comparing unit, under the start of the control unit;

the parsing and comparing unit is used for parsing the information header from the input multimedia broadcasting service information in accordance with the indication of the control unit, and acquiring from emergency broadcasting indication information parsed from the information header that there is a new emergency broadcasting message needed to be received, and outputting the parsed emergency broadcasting message from the multimedia broadcasting control information to the display unit;

the display unit is used for displaying the input emergency broadcasting message.

Further, when the control unit does not start the reception unit to receive the multimedia broadcasting information, the control unit may be used for periodically starting the reception unit to receive multimedia broadcasting control information, and indicating the parsing and comparing unit to parse the multimedia broadcasting control information; then issuing indication to stop receiving the information to the reception unit after receiving the indication of the parsing and comparing unit to close the reception unit;

the reception unit may be used for outputting the received multimedia broadcasting control information to the parsing and comparing unit, under the start of the control unit; and stopping receiving the multimedia broadcasting control information via a first logic after receiving the indication of the control unit to stop receiving the information;

the parsing and comparing unit may be further connected with the control unit, for is parsing the multimedia broadcasting control information and an information header thereof according to the indication of the control unit; and issuing indication to close the reception unit to the control unit after parsing all the messages in the emergency broadcasting message queue from the multimedia broadcasting control information.

Further, the parsing and comparing unit may be further used for pre-initializing and storing emergency broadcasting message variables, i.e., setting the value of an emergency broadcasting indicator variable to be a first initial value, setting the values of a concurrent message quantity variable and a received message quantity variable to be a second initial value respectively, and setting a message queue linked list to be Null; wherein the first initial value may be equal to the initial value of emergency broadcasting indication information in the information header for representing that there is a new emergency broadcasting message queue, and the second initial value may be equal to the initial value of concurrent message quantity information in the control information for representing the message quantity in the emergency broadcasting message queue.

Further, the parsing and comparing unit may compare the value of the parsed emergency broadcasting indication information with the value of the emergency broadcasting indicator variable, if they are not equal, it may assign the value of the emergency broadcasting indication information to the emergency broadcasting indicator variable for storing, and parse the concurrent message quantity information and message ID from the control information; when the message ID is determined to be not existent in the message queue linked list, it may assign the value of concurrent message quantity information to the concurrent message quantity variable for storing, and then shift the value of the received message quantity variable by one unit quantity, which is used for representing one emergency broadcasting message in the emergency broadcasting message queue, and put the message ID in the message queue linked list; at the same time it may output the parsed emergency broadcasting message to the display unit; when the value of the concurrent message quantity variable is determined to be less than the value of the received message quantity variable, it may continue is parsing the next emergency broadcasting message until the value of the concurrent message quantity variable is equal to the value of the received message quantity variable; it may reset the values of the concurrent message quantity variable and the received message quantity variable to be equal to the second initial value respectively, reset the message queue linked list to be Null, and indicate the control unit to close the reception unit.

Further, in the beginning that the terminal needs to receive the multimedia broadcasting service information, the control unit, may be further used for starting the reception unit to receive the multimedia broadcasting service information, and indicating the parsing and comparing unit to parse the multimedia broadcasting service information simultaneously; indicating the reception unit to receive the multimedia broadcasting control information after receiving the indication of the parsing and comparing unit to receive the multimedia broadcasting control information, and at the same time, indicating the parsing and comparing unit to parse the emergency broadcasting message in the multimedia broadcasting control information;

the reception unit may be used for outputting the multimedia broadcasting service information received via the second logic channel to the parsing and comparing unit, under the start of the control unit; and outputting the multimedia broadcasting control information received via the first logic channel to the parsing and comparing unit after receiving the indication of the control unit to receive the multimedia broadcasting control information;

the parsing and comparing unit may be used for parsing the input multimedia broadcasting service information, and acquiring from the emergency broadcasting indication information parsed from the information header of the multimedia broadcasting service information that there is a new emergency broadcasting message needed to be received, then indicating the control unit that the multimedia broadcasting control information needs to be received; after receiving the indication of the control unit to parse the emergency broadcasting message, outputting the emergency broadcasting message parsed from the input control information; and acquiring from the emergency is broadcasting indication information parsed from the information header of the multimedia broadcasting service information that there is no new emergency broadcasting message needed to be received, outputting the parsed service information payload data to the display unit;

the display unit may be used for displaying the input emergency broadcasting message, and/or used for displaying the input service information payload data.

Further, the parsing and comparing unit may indicate the control unit to resume receiving the multimedia broadcasting service information, after parsing all the emergency broadcasting messages in the emergency broadcasting message queue from the multimedia broadcasting control information;

the control unit may indicate the reception unit to resume receiving the multimedia broadcasting service information after receiving the indication of the parsing and comparing unit to resume receiving the multimedia broadcasting service information.

The method and device of the present invention control the use of logic channel in different manners, which not only enables the terminal to periodically open the logic channel to receive all the emergency broadcasting messages punctually, but also enables the terminal to open or close logic channel 0 as required during watching TV to receive all the emergency broadcasting messages in time, thereby effectively preventing high power consumption and resource wasting in the course of reception.

DETAILED DESCRIPTION

The inventive concept of a method and device for receiving emergency broadcasting messages provided by the present invention is that: when a terminal has not started a reception unit to receive service information via logic channel 1, it periodically starts a reception unit to receive control information via logic channel 0, and closes the reception unit after parsing and displaying all the messages in an emergency broadcasting message queue when it acquires from the information header of the control information that there is an emergency broadcasting message needed to be received. Alternatively, when the terminal has started the reception unit to receive service information via logic channel 1, if it acquires from the information header of the service information that there is an emergency broadcasting message needed to be received, the terminal indicates the reception unit to receive control information via logic channel 0, and resumes receiving service information via logic channel 1 after parsing and displaying all the messages in an emergency broadcasting message queue.

The above-mentioned technical scheme of the present invention will be illustrated in detail with reference to the drawings and specific embodiments. Although the following is expressed by taking a broadcasting channel frame of the CMMB system as an embodiment, it is only provided to illustrate rather than limit the present invention. Actually, the method and device of the present invention are applicable to any mobile multimedia broadcasting system of separating the control information and service information on different logic channels for transmission.

Embodiment 1

Figure 1:
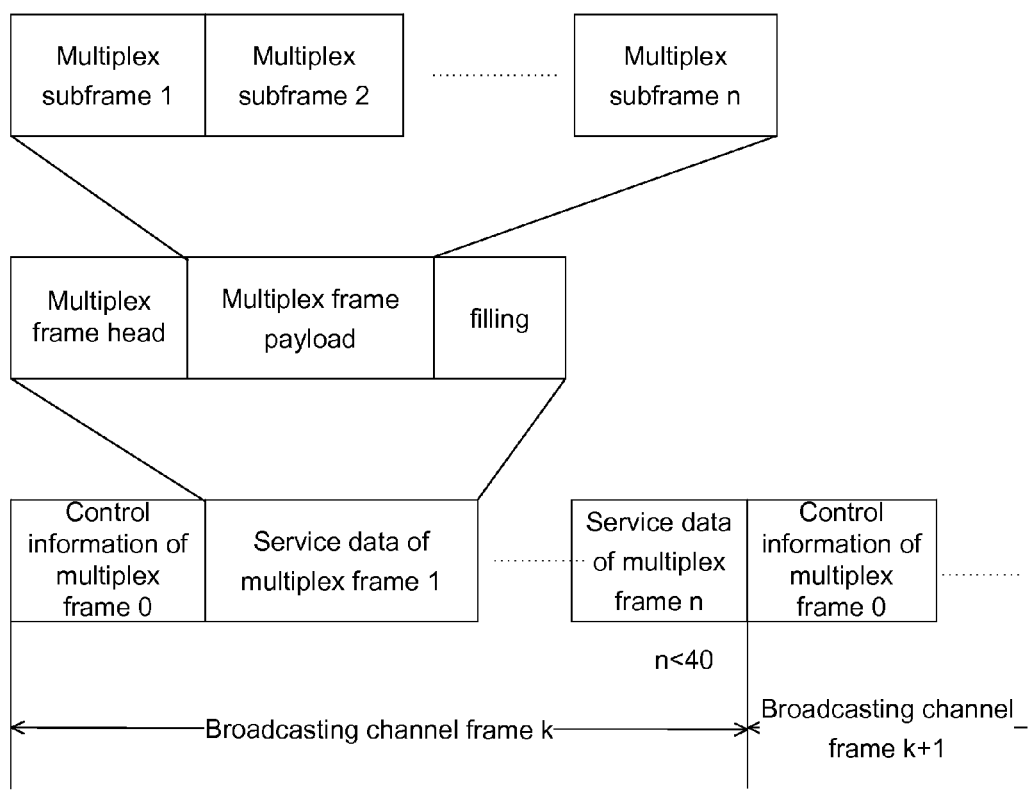
FIG. 1 is a structural diagram of broadcasting channel frames of the CMMB system.
Figure 2:
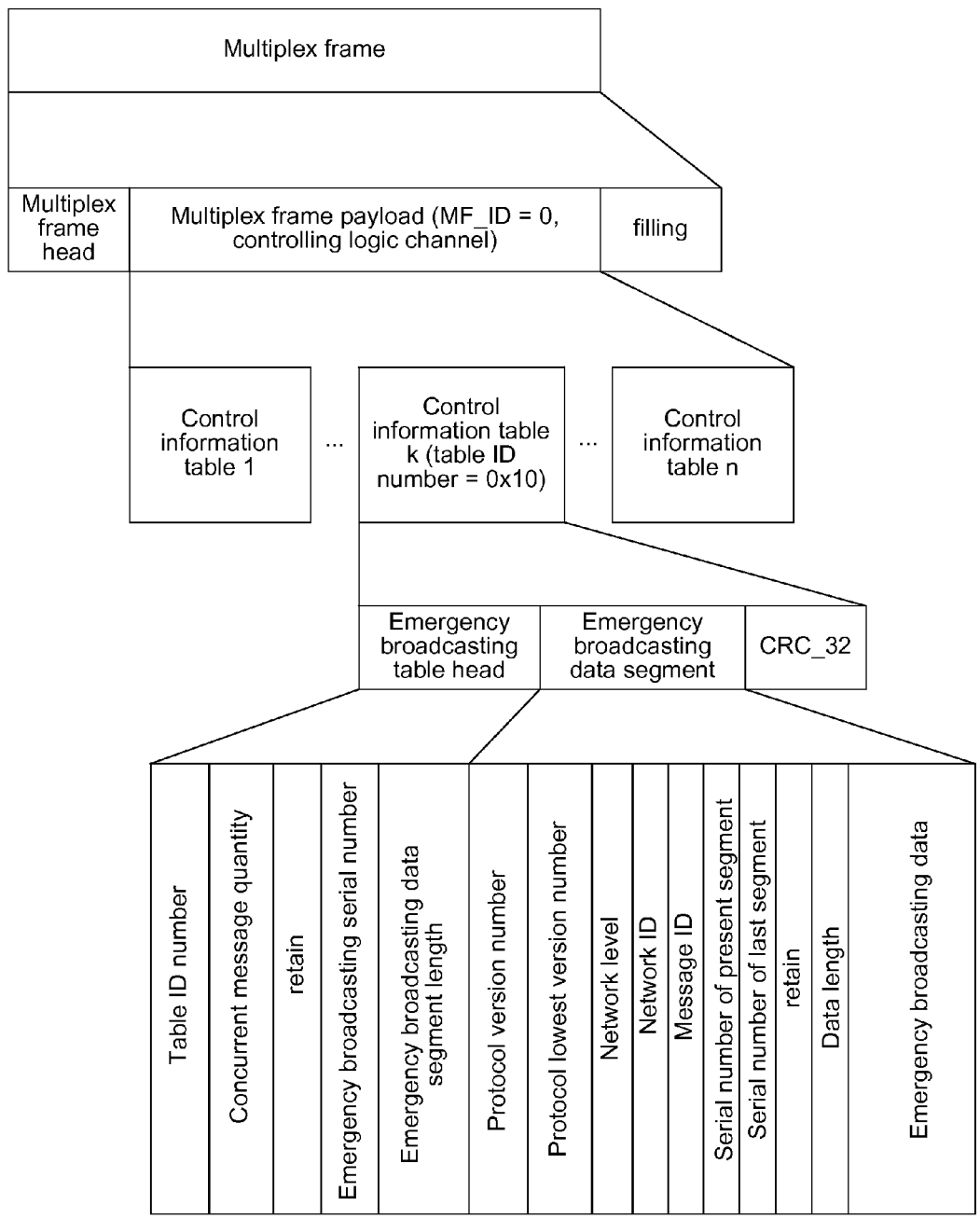
FIG. 2 is a structural schematic diagram of emergency broadcasting messages of the control information multiplex frame in FIG. 1.
Figure 3:
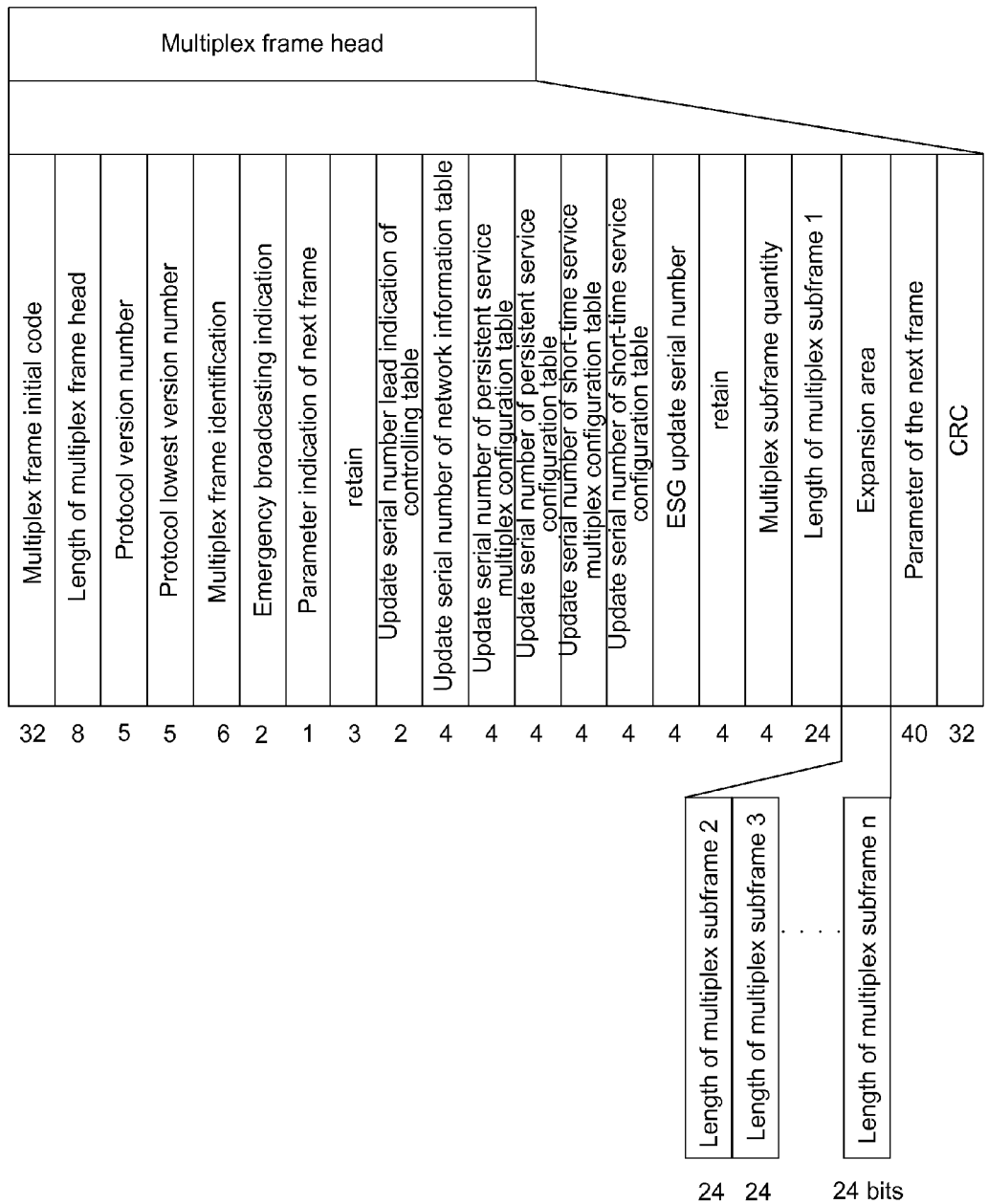
FIG. 3 is a structural schematic diagram of the multiplex frame head in the broadcasting channel frame in FIG. 1.
Figure 4:
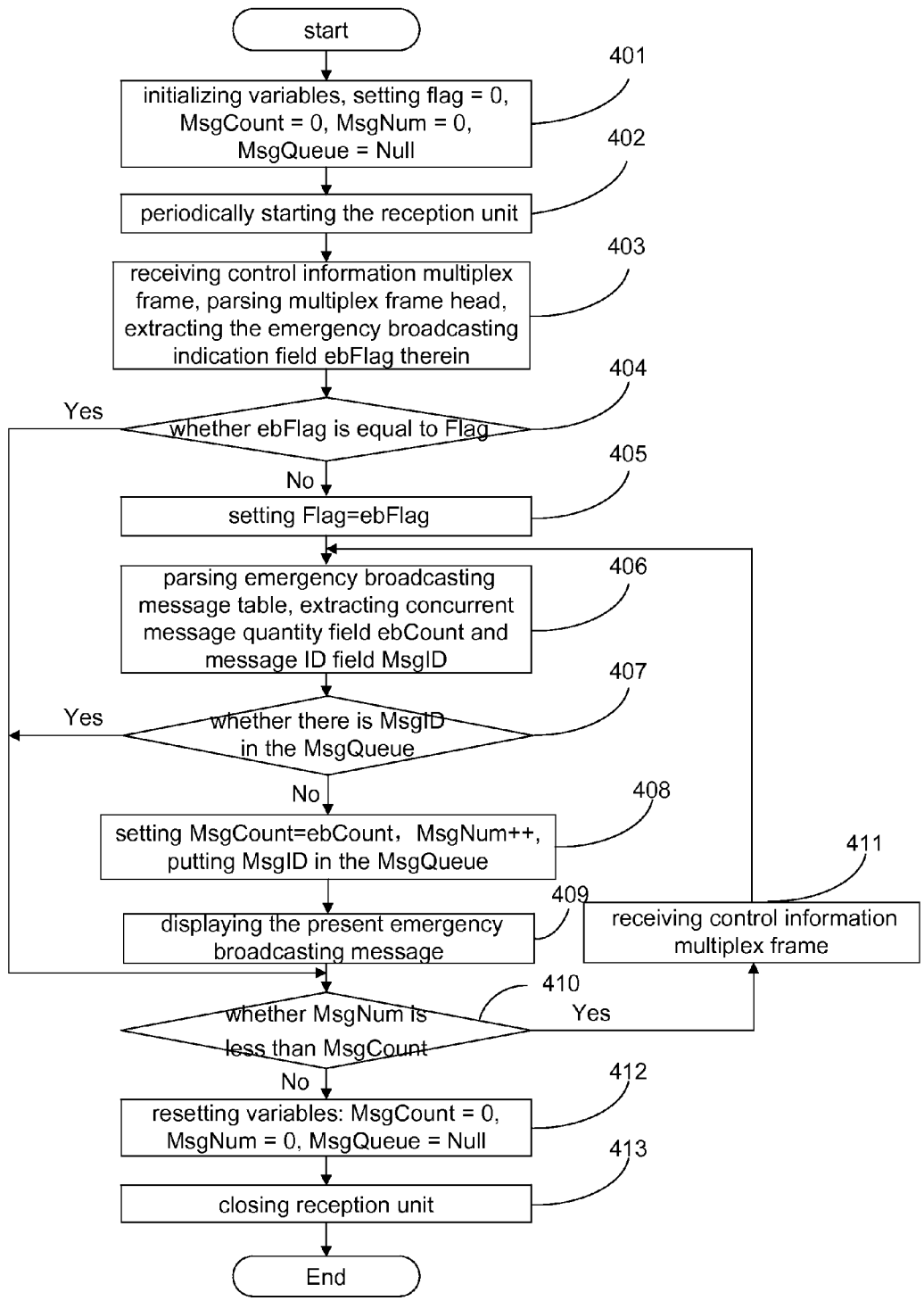
FIG. 4 is a flow chart of an embodiment of a method for receiving emergency broadcasting messages of the present invention.

As shown in FIG. 4, under the scene that logic channel 1 is not occupied, i.e., at the same time that the terminal starts a mobile TV service (now a reception unit has not been started and logic channel 1 is not occupied), the terminal starts a timer to operate, is the timer periodically starts the reception unit to receive an emergency broadcasting message queue via logic channel 0, and closes the reception unit in time after receiving all the messages in the message queue, which comprises the following steps.

Step 401: initializing emergency broadcasting message variables, i.e., setting: emergency broadcasting indicator variable flag=0, concurrent message quantity variable MsgCount=0, received message quantity variable MsgNum=0, and message queue linked list MsgQueue=Null.

Step 402: starting the reception unit by the timer periodically.

Step 403: receiving a control information multiplex frame, parsing the multiplex frame head, and extracting 'emergency broadcasting indication' field ebFlag.

Actually, the multiplex frame head here can be parsed either by receiving control information multiplex frame or by receiving service information multiplex frame. The difference lies in that the latter parses the emergency broadcasting message queue by receiving the control information multiplex frame after determining that a new emergency broadcasting message queue needs to be received.

Step 404: determining whether ebFlag is equal to flag (guaranteeing to no longer receive and process the same emergency broadcasting message queue), if yes, entering step 410; otherwise, entering step 405.

Step 405: setting emergency broadcasting indicator variable flag=ebFlag.

Step 406: parsing an emergency broadcasting information table in the control information multiplex frame, and extracting 'concurrent message quantity' field ebCount and 'message ID' field MsgID.

Step 407: determining whether there is MsgID in the message queue linked list MsgQueue, if yes, executing step 410; otherwise, executing step 408.

Step 408: setting MsgCount=ebCount, MsgNum++, and putting the MsgID in the MsgQueue Step 409: displaying the present emergency broadcasting message Step 410: determining whether MsgNum is less than MsgCount, if yes, executing step 411; otherwise, executing step 412.

Step 411: receiving the control information multiplex frame, and then executing step 406.

Step 412: resetting variables: MsgCount=0, MsgNum=0, MsgQueue=Null.

Step 413: closing the reception unit, and terminating the flow.

The present invention enables the terminal to receive all the emergency broadcasting message queues and all the emergency broadcasting messages therein after entering the mobile TV service at any time when transmitting the emergency broadcasting message, by periodically starting the reception unit to execute step 403 to step 413 in the above flow. Furthermore, in the course of reception, since the same emergency broadcasting message queue is avoided from being repeatedly received, and the reception unit is closed in time when the received message quantity variable MsgNum is equal to concurrent message quantity variable MsgCount in the message queue, the time for waiting for and receiving emergency broadcasting messages is greatly shortened, thereby effectively preventing high power consumption and resource wasting in the course of reception.

Figure 5:
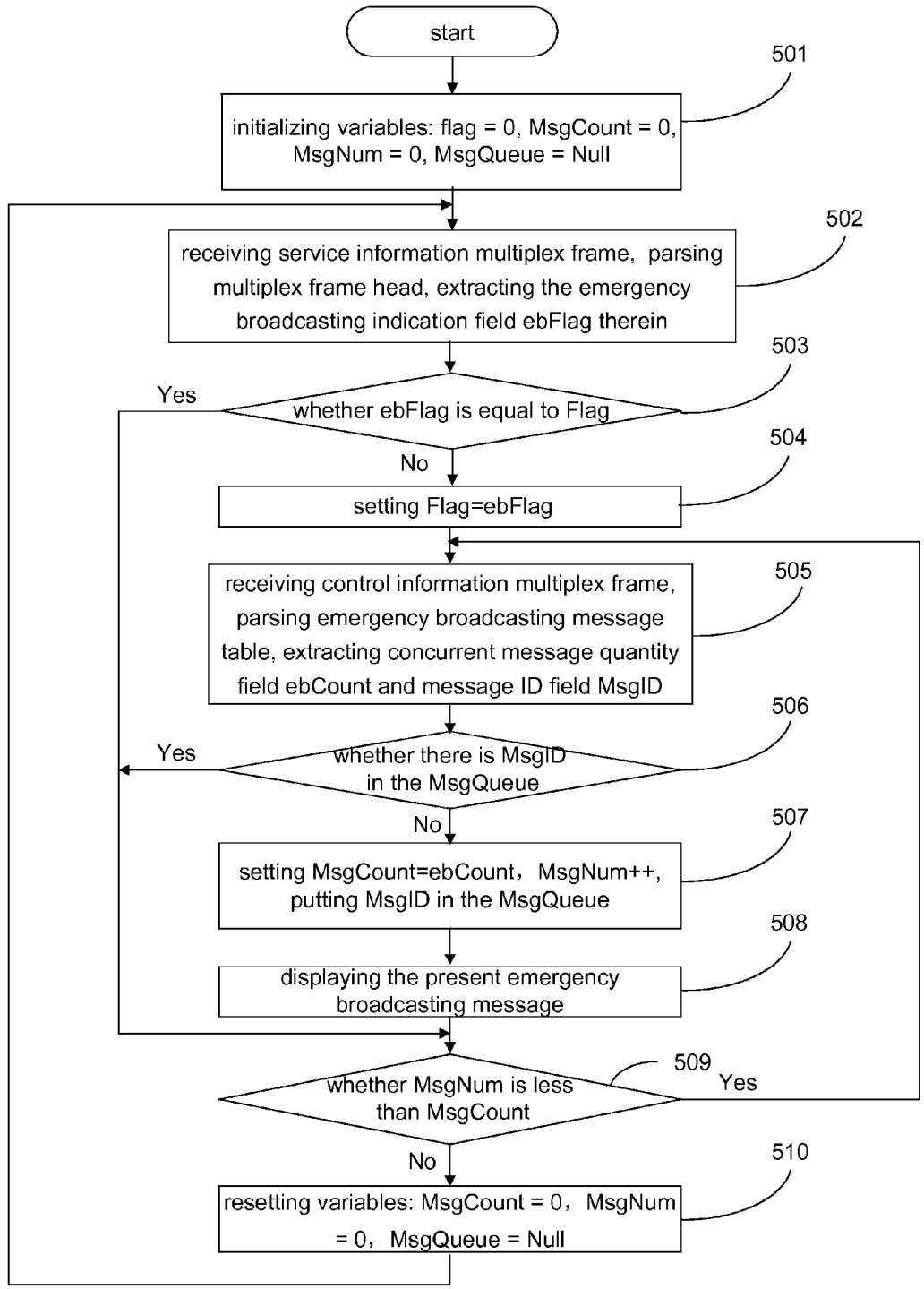
FIG. 5 is a flow chart of another embodiment of the method for receiving emergency broadcasting messages of the present invention.

As shown in FIG. 5, under the scene that logic channel 1 has been occupied, i.e., a terminal is receiving service information multiplex frame to receive TV programs or other service information via logic channel 1, every time the 'emergency broadcasting indication' field in the multiplex frame head of the multiplex frame indicating that there is an emergency broadcasting message currently (i.e. the field value is a non-zero value) is detected, logic channel 0 is opened to receive control information multiplex frame, and logic channel 0 is closed in time after receiving all the messages in the emergency broadcasting message queue, so as to receive the service information multiplex frame via logic channel 1 again, comprising the following steps.

Step 501: initializing emergency broadcasting message variables, i.e., setting: emergency broadcasting indicator variable flag=0, concurrent message quantity variable MsgCount=0, received message quantity variable MsgNum=0, and message queue linked list MsgQueue=Null.

Step 502: receiving a service information multiplex frame, parsing the multiplex frame head of the multiplex frame, and extracting 'emergency broadcasting indication' field ebFlag therein.

Step 503: determining whether ebFlag is equal to flag (guaranteeing to no longer receive and process the same emergency broadcasting message queue), if yes, entering step 509; otherwise, entering step 504.

Step 504: setting emergency broadcasting indicator variable flag=ebFlag.

Step 505: receiving a control information multiplex frame, parsing an emergency broadcasting information table in the control information multiplex frame, and extracting 'concurrent message quantity' field ebCount and 'message ID' field MsgID.

Step 506: determining whether there is MsgID in MsgQueue, if yes, executing step 509; otherwise, executing step 507.

Step 507: setting MsgCount=ebCount, MsgNum++, and putting the MsgID in the MsgQueue.

Step 508: displaying the present emergency broadcasting message.

Step 509: determining whether MsgNum is less than MsgCount, if yes, returning to step 505 and executing; otherwise, executing step 510.

Step 510: resetting variables: MsgCount=0, MsgNum=0, MsgQueue=Null; and returning to step 502 and executing.

The present invention enables the terminal to open logic channel 0 in time to receive the present emergency broadcasting message queue and all the emergency broadcasting messages therein at the same time when receiving mobile TV service information by executing above flows. Furthermore, in the course of reception, since the same emergency broadcasting message queue is avoided from being repeatedly received, and logic channel 0 is closed in time when the received message quantity variable MsgNum is equal to concurrent message quantity variable MsgCount in the message queue, the time for waiting for emergency broadcasting messages is greatly shortened, thereby effectively preventing high power consumption and resource wasting in the course of reception.

Figure 6:
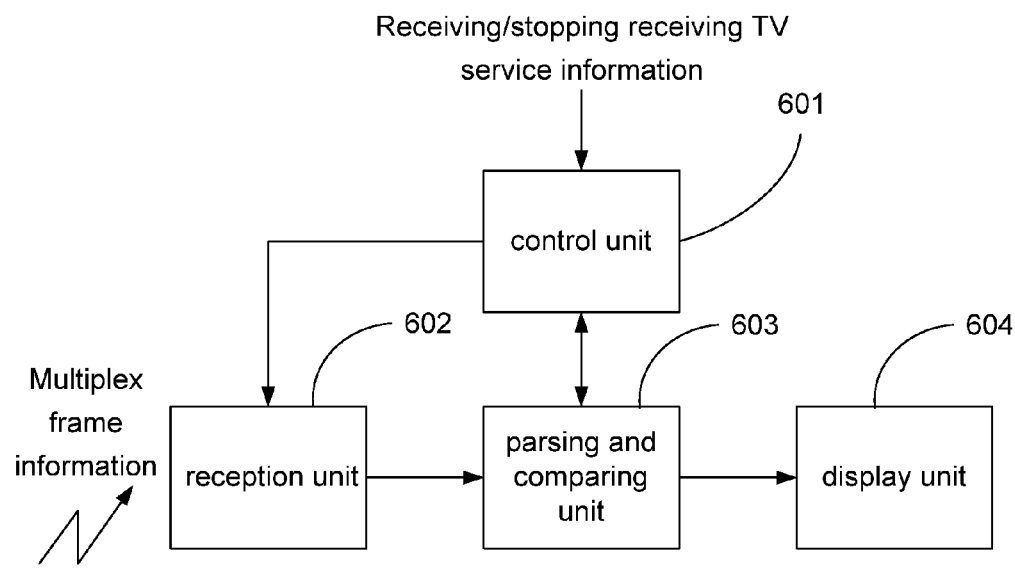
FIG. 6 is a structural schematic diagram of a device for receiving emergency broadcasting messages of the present invention.

As shown in FIG. 6, it is a mobile terminal for receiving emergency broadcasting messages provided by the present invention, and the mobile terminal comprises a control unit 601, a reception unit 602, a parsing and comparing unit 603 and a display unit 604, which are connected in sequence, wherein:

the control unit 601 is used for periodically starting the reception unit 602 to receive a control information multiplex frame via logic channel 0 when the terminal stops receiving multimedia broadcasting service information (i.e., after receiving the message that the terminal stops receiving the multimedia broadcasting service information), and at the same time, indicating the parsing and comparing unit 603 to parse the control information multiplex frame; and issuing indication to stop receiving the information to the reception unit 602, after receiving the indication of the parsing and comparing unit 603 to close the reception unit. Actually, the reception unit 602 here can also be started to receive a service information multiplex frame via logic channel 1; the reason has been described before, so no more unnecessary details are given here.

When the terminal starts to receive the multimedia broadcasting service information (i.e. after receiving the message that the terminal starts to receive the multimedia broadcasting service information), the reception unit 602 is started to receive the service information multiplex frame via logic channel 1, and the parsing and comparing unit 603 is indicated to parse the service information multiplex frame simultaneously; the reception unit 602 is indicated to receive the control information multiplex frame via logic channel 0 after receiving the indication of the parsing and comparing unit 603 that the control information needs to be received, and the parsing and comparing unit 603 is indicated to parse the emergency broadcasting message in the control information multiplex frame at the same time; then the indication is issued to resume receiving service information multiplex frame to the reception unit 602 after receiving the indication of the parsing and comparing unit 603 to continue receiving the service information.

The reception unit 602 is used for, under the start of the control unit 601, outputting the received control information multiplex frame to the parsing and comparing unit 603, and stopping working after receiving the indication of the control unit 601 to stop receiving the information.

Alternatively, under the indication of the control unit 601, the reception unit 602 outputs the received service information multiplex frame and control information multiplex frame to the parsing and comparing unit 603.

The parsing and comparing unit 603 is further connected with the control unit 601, for pre-initializing the emergency broadcasting message variables, i.e. setting: emergency broadcasting indicator variable flag=0, concurrent message quantity variable MsgCount=0, received message quantity variable MsgNum=0, and message queue linked list MsgQueue=Null; and for parsing the input control information multiplex frame (or service information multiplex frame) according to the indication of the control unit 601, and if acquiring from the emergency broadcasting indication field value parsed from the multiplex frame head of the multiplex frame that there is a new emergency broadcasting message queue needed to be received, outputting all the messages in the emergency broadcasting message queue parsed from the control information multiplex frame to the display unit 604, and then issuing an indication to close the reception unit to the control unit 601.

Alternatively, the parsing and comparing unit 603 parses the input service information multiplex frame, and indicates the control unit 601 that the control information needs to be received if acquiring from the emergency broadcasting indication field value parsed from the multiplex frame head of the multiplex frame that there is a new emergency broadcasting message queue needed to be received; after receiving the indication of the control unit 601 to parse the emergency broadcasting message, it outputs all the messages in the emergency broadcasting message queue parsed from the input control information multiplex frame to the display unit 604, and then issues the indication to continue receiving the service information to the control unit 601; if acquiring from the emergency broadcasting indication field value parsed from the multiplex frame head that there is no new emergency broadcasting message queue needed to be received, it outputs the parsed service information payload data to the display unit.

Specifically, the parsing and comparing unit 603 is used for comparing the parsed emergency broadcasting indication field value ebFlag with the emergency broadcasting indicator variable Flag, if they are not equal, assigning the value of ebFlag to the Flag and then storing, and parsing the concurrent message quantity field value ebCount and message ID field MsgID for identifying message from the control information multiplex frame; when the MsgID is determined to be not existent in the message queue linked list MsgQueue, assigning the value of ebCount to the MsgCount and then storing, and adding 1 to the received message quantity variable MsgNum and then storing; putting the MsgID in the MsgQueue; meanwhile, outputting the parsed present emergency broadcasting message to the display unit 604; when the MsgCount is determined to be still less than MsgNum, continuing to parse the next emergency broadcasting message until MsgCount=MsgNum, then resetting the MsgCount and MsgNum to be equal to 0, and resetting MsgQueue=Null, and indicating the control unit 601 to close the reception unit, or indicating the control unit 601 to continue receiving the service information.

The display unit 604 is used for displaying all the messages in the input emergency broadcasting message queue, and/or for displaying the input service information payload data.

Of course, the present invention may still have other various embodiments. Those skilled in the art can make corresponding changes and variations according to the present invention, without departing from the spirit and substance of the present invention, and all the corresponding changes and variations should belong to the scope of the claims of the present invention that follow.

What is claimed is:

1. A method for receiving emergency broadcasting messages, comprising:
    initializing emergency broadcasting message variables, which comprise an emergency broadcasting indicator variable, a concurrent message quantity variable and a received message quantity variable, including steps of setting a value of the emergency broadcasting indicator variable to be a first initial value, setting values of the concurrent message quantity variable and the received message quantity variable to be a second initial value respectively, and setting a message queue linked list to be Null;
    receiving multimedia broadcasting service information and an information header of the multimedia broadcasting service information;
    determining, by a terminal, whether there is a new emergency broadcasting message needed to be received, from the received information header of the multimedia broadcasting service information;
    receiving multimedia broadcasting control information, when determining that there is a new emergency broadcasting message needed to be received; and
    parsing the emergency broadcasting message from multimedia broadcasting control information,
    wherein the first initial value is equal to an initial value of emergency broadcasting indication information in the information header for representing that there is a new emergency broadcasting message, and the second initial value is equal to an initial value of concurrent message quantity information in the multimedia broadcasting control information for representing message quantity in the emergency broadcasting message.

2. The method according to claim 1, wherein the emergency broadcasting message comprises a queue of emergency broadcasting messages, and wherein the first initial value is equal to an initial value of emergency broadcasting indication information in the information header for representing that there is a new emergency broadcasting message queue, and the second initial value is equal to an initial value of concurrent message quantity information in the multimedia broadcasting control information for representing message quantity in the emergency broadcasting message queue.

3. The method according to claim 2, wherein the terminal receives the multimedia broadcasting service information via a second logic channel, and continues receiving the service information via the second logic channel after parsing and displaying all of the messages in the emergency broadcasting message queue from the received multimedia broadcasting control information via a first logic channel; wherein the second logic channel is logic channel 1, and the first logic channel is logic channel 0.

4. The method according to claim 2, further comprising:
(1) the terminal receiving the service information, and parsing the emergency broadcasting indication information from the information header of the service information, then determining whether the value of the emergency broadcasting indication information is equal to the value of the emergency broadcasting indicator variable; if yes, skipping step (2) and jumping to execution of step (3); otherwise, setting the value of the emergency broadcasting indicator variable to be equal to the value of emergency broadcasting indication information, followed by execution of step (2);
(2) the terminal receiving the control information, parsing the emergency broadcasting information in the control information, extracting the concurrent message quantity information and message ID, and determining whether there is the message ID in the message queue linked list, if yes, jumping to execution of step (3); otherwise, setting the value of concurrent message quantity variable to be equal to the value of the concurrent message quantity information; shifting the value of the received message quantity variable by one unit quantity, which represents one emergency broadcasting message in the emergency broadcasting message queue, and then putting the message ID in the message queue linked list; and at the same time, displaying the present emergency broadcasting message, followed by execution of step (3);
(3) the terminal determining whether the value of the concurrent message quantity variable is less than the value of the received message quantity variable, if yes, jumping to execution of step (2); otherwise, resetting the value of the concurrent message quantity variable and the value of the received message quantity variable to be equal to the second initial value, and resetting the message queue linked list to be Null, and then jumping to execution of step (1).

5. A method for receiving emergency broadcasting messages, comprising:
(1) the terminal receiving the multimedia broadcasting control information, and parsing the emergency broadcasting indication information from the information header of the multimedia broadcasting control information, then determining whether the value of the emergency broadcasting indication information is equal to the value of the emergency broadcasting indicator variable; if yes, skipping step (2) and jumping to execution step (3); otherwise, setting the value of the emergency broadcasting indicator variable to be equal to the value of emergency broadcasting indication information, followed by execution of step (2);
(2) the terminal parsing the emergency broadcasting information in the multimedia broadcasting control information, extracting the concurrent message quantity information and message ID, and determining whether there is the message ID in the message queue linked list, if yes, jumping to execution of step (3); otherwise, setting the value of concurrent message quantity variable to be equal to the value of the concurrent message quantity information; shifting the value of the received message quantity variable by one unit quantity, which is represents one emergency broadcasting message in the emergency broadcasting message queue, and then putting the message ID in the message queue linked list; and at the same time, displaying the present emergency broadcasting message, followed by execution of step (3);
(3) the terminal determining whether the value of the concurrent message quantity variable is less than the value of the received message quantity variable, if yes, continuing receiving the control information, and then jumping to execution of step (2); otherwise, resetting the value of the concurrent message quantity variable and the value of the received message quantity variable to be equal to the second initial value respectively, resetting the message queue linked list to be Null, and stopping receiving the control information at the same time.

6. The method according to claim 5, further comprising:
(1) the terminal receiving the multimedia broadcasting control information, and parsing the emergency broadcasting indication information from the information header of the multimedia broadcasting control information, then determining whether the value of the emergency broadcasting indication information is equal to the value of the emergency broadcasting indicator variable; if yes, skipping step (2) and jumping to execution of step (3); otherwise, setting the value of the emergency broadcasting indicator variable to be equal to the value of emergency broadcasting indication information, followed by execution of step (2);
(2) the terminal parsing the emergency broadcasting information in the multimedia broadcasting control information, extracting the concurrent message quantity information and message ID, and determining whether there is the message ID in the message queue linked list, if yes, jumping to execution step (3); otherwise, setting the value of concurrent message quantity variable to be equal to the value of the concurrent message quantity information; shifting the value of the received message quantity variable by one unit quantity, which represents one emergency broadcasting message in the emergency broadcasting message queue, and then putting the message ID in the message queue linked list; and at the same time, displaying the present emergency broadcasting message, followed by execution of step (3) the terminal determining whether the value of the concurrent message quantity variable is less than the value of the received message quantity variable, if yes, continuing receiving the control information, and then jumping to execution of step (2); otherwise, resetting the value of the concurrent message quantity variable and the value of the received message quantity variable to be equal to the second initial value respectively, resetting the message queue linked list to be Null, and stopping receiving the control information at the same time.

7. A communication mobile terminal for receiving emergency broadcasting messages, comprising a control unit, a reception unit and a parsing and comparing unit, which are connected in sequence, wherein:
the control unit is operable to start the reception unit to receive multimedia broadcasting service information, and at the same time, indicate the parsing and comparing unit to parse an information header of multimedia broadcasting service information;
the reception unit is operable to output the received multimedia broadcasting service information to the parsing and comparing unit, under the start of the control unit;
the parsing and comparing unit is operable to pre-initialize and store emergency broadcasting message variables, parse the information header from the input multimedia broadcasting service information in accordance with the indication of the control unit, and acquiring determine from emergency broadcasting indication information parsed from the information header whether there is a new emergency broadcasting message needed to be received, wherein the pre-initialization includes setting the value of an emergency broadcasting indicator variable to be a first initial value, setting the values of a concurrent message quantity variable and a received message quantity variable to be a second initial value respectively, and setting a message queue linked list to be Null, and wherein the first initial value is equal to the initial value of emergency broadcasting indication information in the information header for representing that there is a new emergency broadcasting message queue, and the second initial value is equal to the initial value of concurrent message quantity information in the control information for representing the message quantity in the emergency broadcasting message queue.

8. The mobile terminal according to claim 7, wherein when the control unit does not start the reception unit to receive the multimedia broadcasting information, the control unit is operable to periodically start the reception unit to receive multimedia broadcasting control information, and indicate the parsing and comparing unit to parse the multimedia broadcasting control information; then issue indication to stop receiving the information to the reception unit after receiving the indication of the parsing and comparing unit to close the reception unit;

the reception unit is operable to output the received multimedia broadcasting control information to the parsing and comparing unit, under the start of the control unit; and stop receiving the multimedia broadcasting control information via a first logic after receiving the indication of the control unit to stop receiving the information;

the parsing and comparing unit is further connected with the control unit, operable to parse the multimedia broadcasting control information and an information header of the multimedia broadcasting control information according to the indication of the control unit; and issue indication to close the reception unit to the control unit after parsing all the messages in the emergency broadcasting message queue from the multimedia broadcasting control information.

9. The mobile terminal according to claim 8, wherein once the terminal needs to receive the multimedia broadcasting service information, the control unit is further operable to start the reception unit to receive the multimedia broadcasting service information, and indicate the parsing and comparing unit to parse the multimedia broadcasting service information simultaneously; indicating the reception unit to receive the multimedia broadcasting control information after receiving the indication of the parsing and comparing unit to receive the multimedia broadcasting control information, and at the same time, indicate the parsing and comparing unit to parse the emergency broadcasting message in the multimedia broadcasting control information;

the reception unit is operable to output the multimedia broadcasting service information received via the second logic channel to the parsing and comparing unit, under the start of the control unit; and output the multimedia broadcasting control information received via the first logic channel to the parsing and comparing unit after receiving the indication of the control unit to receive the multimedia broadcasting control information;

the parsing and comparing unit is operable to parse the input multimedia broadcasting service information, and determine from the emergency broadcasting indication information parsed from the information header of the multimedia broadcasting service information that there is a new emergency broadcasting message needed to be received, then indicate the control unit that the multimedia broadcasting control information needs to be received; after receiving the indication of the control unit to parse the emergency broadcasting message, parse the emergency broadcasting message from the multimedia broadcasting control information input by the reception unit; and determine from the emergency broadcasting indication information parsed from the information header of the multimedia broadcasting service information whether there is a new emergency broadcasting message needed to be received.

10. The mobile terminal according to claim 9, wherein the parsing and comparing unit indicates the control unit to resume receiving the multimedia broadcasting service information, after parsing all the emergency broadcasting messages in the emergency broadcasting message queue from the multimedia broadcasting control information;

the control unit indicates the reception unit to resume receiving the multimedia broadcasting service information after receiving the indication of the parsing and comparing unit to resume receiving the multimedia broadcasting service information 11. The mobile terminal according to claim 7, wherein the parsing and comparing unit compares the value of the parsed emergency broadcasting indication information with the value of the emergency broadcasting indicator variable, if they are not equal, it assigns the value of the emergency broadcasting indication information to the emergency broadcasting indicator variable for storing, and parses the concurrent message quantity information and message ID from the control information; when the message ID is determined to be not existent in the message queue linked list, it assigns the value of concurrent message quantity information to the concurrent message quantity variable for storing, and then shifts the value of the received message quantity variable by one unit quantity, which represents one emergency broadcasting message in the emergency broadcasting message queue, and puts the message ID in the message queue linked list;

when the value of the concurrent message quantity variable is determined to be less than the value of the received message quantity variable, it continues parsing the next emergency broadcasting message until the value of the concurrent message quantity variable is equal to the value of the received message quantity variable; it resets the values of the concurrent message quantity variable and the received message quantity variable to be equal to the second initial value respectively, resets the message queue linked list to be Null, and indicates the control unit to close the reception unit.

12. The mobile terminal according to claim 11, wherein once the terminal needs to receive the multimedia broadcasting service information, the control unit is further operable to start the reception unit to receive the multimedia broadcasting service information, and indicate the parsing and comparing unit to parse the multimedia broadcasting service information simultaneously; indicate the reception unit to receive the multimedia broadcasting control information after receiving the indication of the parsing and comparing unit to receive the multimedia broadcasting control information, and at the same time, indicate the parsing and comparing unit to parse the emergency broadcasting message in the multimedia broadcasting control information;

the reception unit is operable to output the multimedia broadcasting service information received via the second logic channel to the parsing and comparing unit, under the start of the control unit; and output the multimedia broadcasting control information received via the first logic channel to the parsing and comparing unit after receiving the indication of the control unit to receive the multimedia broadcasting control information;

the parsing and comparing unit is operable to parse the input multimedia broadcasting service information, and determine from the emergency broadcasting indication information parsed from the information header of the multimedia broadcasting service information that there is a new emergency broadcasting message needed to be received, then indicate the control unit that the multimedia broadcasting control information needs to be received; after receiving the indication of the control unit to parse the emergency broadcasting message, parse the emergency broadcasting message from the multimedia broadcasting control information input by the reception unit; and determine from the emergency broadcasting indication information parsed from the information header of the multimedia broadcasting service information whether there is a new emergency broadcasting message needed to be received.

13. The mobile terminal according to claim 12, wherein the parsing and comparing unit indicates the control unit to resume receiving the multimedia broadcasting service information, after parsing all the emergency broadcasting messages in the emergency broadcasting message queue from the multimedia broadcasting control information;

the control unit indicates the reception unit to resume receiving the multimedia broadcasting service information after receiving the indication of the parsing and comparing unit to resume receiving the multimedia broadcasting service information.

* * * * *